ис009843535В2

United States Patent
Hao et al.

(10) Patent No.: US 9,843,535 B2
(45) Date of Patent: Dec. 12, 2017

(54) LOW-COST FLOW MATCHING IN SOFTWARE DEFINED NETWORKS WITHOUT TCAMS

(71) Applicant: ALCATEL-LUCENT, Boulogne-Billancourt (FR)

(72) Inventors: Fang Hao, Morganville, NJ (US); Tirunellai V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 156 days.

(21) Appl. No.: 14/881,347

(22) Filed: Oct. 13, 2015

(65) Prior Publication Data
US 2016/0036723 A1    Feb. 4, 2016

Related U.S. Application Data

(62) Division of application No. 13/886,835, filed on May 3, 2013, now Pat. No. 9,210,074.

(51) Int. Cl.
*H04L 12/927* (2013.01)
*H04L 12/721* (2013.01)
*H04L 12/741* (2013.01)
*H04L 12/723* (2013.01)

(52) U.S. Cl.
CPC .............. *H04L 47/80* (2013.01); *H04L 45/38* (2013.01); *H04L 45/74* (2013.01); *H04L 45/50* (2013.01)

(58) Field of Classification Search
CPC ......... H04L 47/80; H04L 45/74; H04L 45/38; H04L 45/50
See application file for complete search history.

(56) References Cited

U.S. PATENT DOCUMENTS

| | | | |
|---|---|---|---|
| 5,917,820 A | 6/1999 | Rekhter | |
| 6,389,023 B1 | 5/2002 | Matsuzawa | |
| 6,490,292 B1 | 12/2002 | Matsuzawa | |
| 8,787,388 B1 * | 7/2014 | Adams | .......... H04L 45/38 370/244 |
| 2003/0067929 A1 | 4/2003 | Matsuzawa | |
| 2008/0247380 A1 | 10/2008 | Lavigne | |
| 2011/0292830 A1 | 12/2011 | Yanggratoke | |
| 2011/0307628 A1 | 12/2011 | Chiba | |

(Continued)

FOREIGN PATENT DOCUMENTS

| | | |
|---|---|---|
| EP | 0871309 | 10/1998 |
| WO | 2012056404 | 5/2012 |

OTHER PUBLICATIONS

International Search Report for PCT/US2014/026017 dated Sep. 4, 2014.

(Continued)

*Primary Examiner* — Peter Chau
(74) *Attorney, Agent, or Firm* — Kramer & Amado, P.C.

(57) ABSTRACT

Various exemplary embodiments relate to a method for processing data packets by a first-hop switch in a data network, including: receiving a first data packet associated with a flow; determining whether the flow associated with the first data packet is found in a flow table in the first-hop switch; modifying the first data packet by replacing a packet header field with flow definition information; and transmitting the modified first data packet based upon the flow definition information.

12 Claims, 2 Drawing Sheets

(56) References Cited

U.S. PATENT DOCUMENTS

| | | |
|---|---|---|
| 2012/0093158 A1 | 4/2012 | Chiba |
| 2013/0148666 A1 | 6/2013 | Shimonishi |
| 2013/0170354 A1* | 7/2013 | Takashima .............. H04L 47/12 |
| | | 370/235 |
| 2013/0177016 A1 | 7/2013 | Nakano |
| 2013/0279371 A1 | 10/2013 | Takashima |
| 2013/0322440 A1 | 12/2013 | Chiba |
| 2013/0343388 A1 | 12/2013 | Stroud |
| 2014/0233399 A1 | 8/2014 | Mann |

OTHER PUBLICATIONS

Nagami, et al., "Flow Attribute Notification Protocol (FANP)", Feb. 1, 1997, Internet Engineering Task Force Internet Draft. pp. 1-18.

* cited by examiner

LOW-COST FLOW MATCHING IN SOFTWARE DEFINED NETWORKS WITHOUT TCAMS

CROSS REFERENCE TO RELATED APPLICATION

This application is a divisional application of U.S. patent application Ser. No. 13/886,835, filed May 3, 2013, which is hereby incorporated by reference for all purposes as if fully set forth herein.

TECHNICAL FIELD

Various exemplary embodiments disclosed herein relate generally to low-cost flow matching in software defined networks (SDN) without ternary content addressable memory (TCAM).

BACKGROUND

SDNs have gained significant momentum in the networking industry recently. SDNs can potentially simplify network operation and administration, facilitate innovation through software, and reduce the time to market for new network functions. One critical component of the SDN architecture is wildcard based flow matching. Openflow is a widely used SDN implementation. The SDN architecture relies on wildcard matching rules at all the switches in the data path. Software running in a central controller installs and updates such rules in the switch flow table, and hence controls how each packet is processed in the network.

Ternary content addressable memory (TCAM) is the hardware solution for wildcard matching in routers and switches. Despite its flexibility, TCAM is very expensive and has high power consumption.

To understand the context of the problem, the basic operation of the SDN network will be described using Openflow as an example. A typical Openflow network consists of multiple switches and a central controller. There are one or more flow tables on each switch that are capable of doing wildcard-based flow matching. Packet processing and forwarding are done at the switches based on the rules stored in the flow tables. The central controller connects to each switch and controls what rules are set up for each flow.

The basic life-cycle of a flow in the Openflow network may be described as follows. First, a host (for example, a physical host or virtual machine) generates a packet. Second, the first-hop switch (physical switch or virtual switch in hypervisor) looks up the packet in its flow table and tries to find a match by using wildcard matching. Third, because this is the first packet of the flow, no match is found, and hence the packet is forwarded to the central controller. The central controller processes the request, computes the forwarding or flow path for the packet, and installs rules at the corresponding switches along the path to be followed by the packet. The rules contain instructions on how the packet should be treated, e.g., to be queued, forwarded to a port, or dropped. Fourth, the first switch processes the packet according to the rule. Fifth, in a similar way, the other switches along the path of the packet conduct wildcard matching for the packet and process it accordingly. The process continues until the packet is delivered to the destination host. Finally, later packets that belong to the same flow can be processed in the switches without consulting the central controller, because the switches on the path already have the flow entry installed in the flow table.

The existing solution for flow matching uses either software or hardware. Software solutions can be used in hypervisor virtual switches, but are generally not suitable for physical switching devices in production networks due to their limited speed. The hardware solution relies on TCAM, which are very expensive and have high power consumption.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for processing data packets by a first-hop switch in a data network, including: receiving a first data packet associated with a flow; determining whether the flow associated with the first data packet is found in a flow table in the first-hop switch; modifying the first data packet by replacing a packet header field with flow definition information; and transmitting the modified first data packet based upon the flow definition information.

Various exemplary embodiments relate to a method for processing data packets by a last-hop switch in a data network, including: receiving a first data packet associated with a flow, the first data packet having a flow definition information; determining whether the flow associated with the first data packet is found in a flow table in the last-hop switch; modifying the first data packet by replacing flow definition information in a packet header field with original header information based upon the flow definition information; and transmitting the modified first data packet based upon the original header information.

Various exemplary embodiments relate to a method for controlling a data packet network by a central controller, including: receiving flow identification information including a source address and a destination address; determining a flow path through the data packet network for the flow that includes identifying network nodes along the flow path including a first-hop switch, a lost hop switch, and intermediate network nodes; sending flow table data to each identified intermediate network node along the flow path, wherein the flow table data includes a flow identifier and an address for the next node along the flow path; sending flow table data to the first-hop switch, wherein the flow table data includes a destination media access control address (DMAC) and associated network identifier and address identifier, wherein the network identifier identifies a flow and the address identifier identifies different DMACs within the same flow; and sending flow table data to the last-hop switch, wherein the flow table data includes a network identifier and associated address identifier and DMAC.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
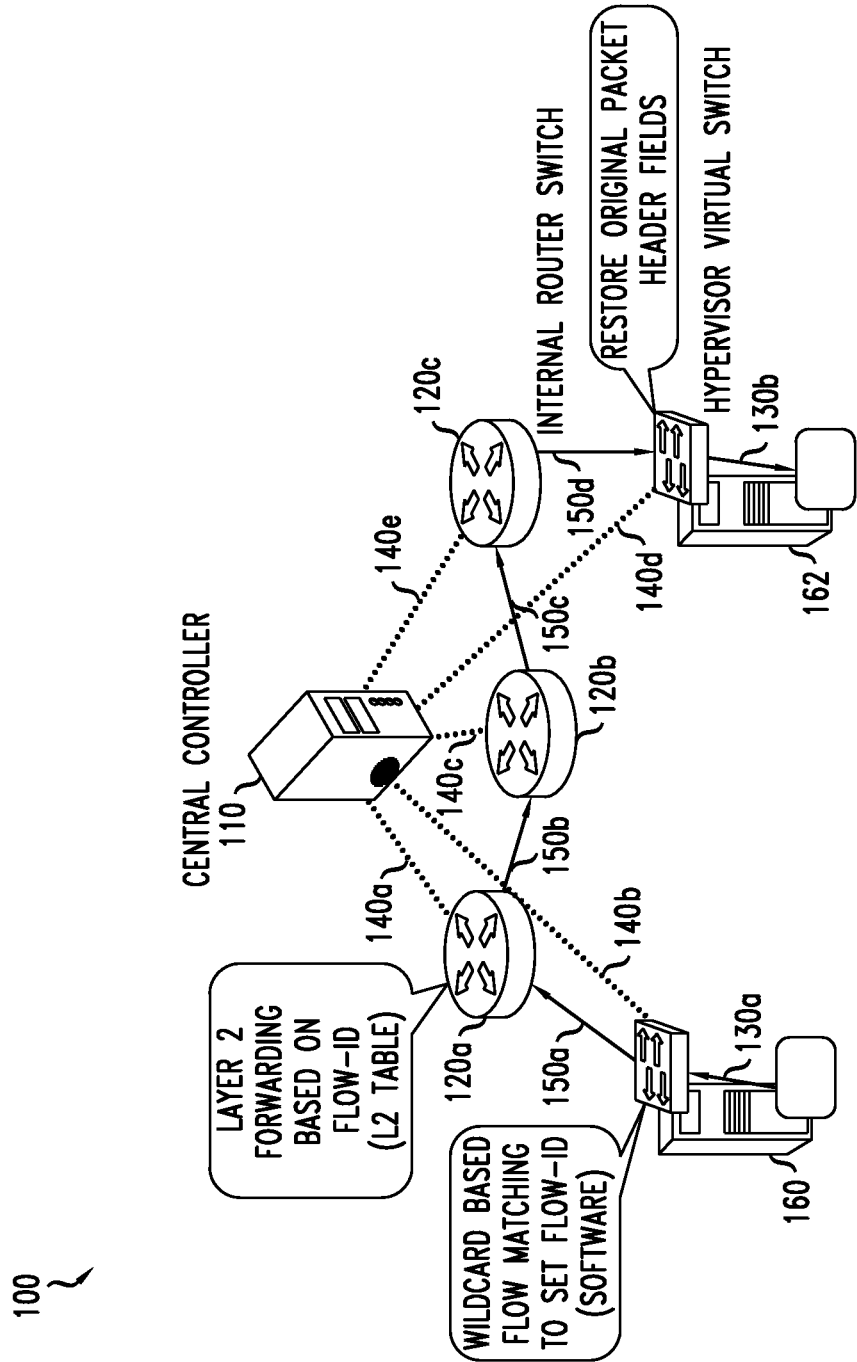
FIG. 1 illustrates an embodiment of a network that implements low-cost flow matching in SDNs.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments may be combined with one or more other embodiments to form new embodiments.

Referring now to the drawings, in which like numerals refer to like components or steps, there are disclosed broad aspects of various exemplary embodiments.

The embodiments described below present a mechanism that supports flow matching functions in SDN networks that may significantly reduce, and in some cases eliminate TCAMs in switches. As a result, the mechanism may significantly reduce the cost of the SDN network without compromising its advantages.

FIG. 1 illustrates an embodiment of a network that implements low-cost flow matching in SDNs. The network 100 may include a source host 160 in communication with a destination host 162. The network 100 further may include a central controller 110, switches 120a-c, first-hop switch 130a, and last-hop switch 130b. The first-hop switch 130a and last-hop switch 130b are illustrated as hypervisor virtual switches in FIG. 1. Further, the first-hop switch and last-hop switch may include various hardware or software based switches, routers, or other network processing nodes that can route network data. Network connections 150a-d connect the first-hop switch 130a, switches 120a-c, and last-hop switch 130b as described in FIG. 1. Further, the central controller 110 uses control connections 140a-e to communicate with the hypervisor virtual switches 130a-b and the switches 120a-c. The switches 120a-c may be any standard network switch, router, or other network processing node that can route network data.

The operation of network 100 will now be described. Wildcard matching may only be performed at the first-hop switch 130a in the network 100 and a new flow-id may be assigned to each flow. The new flow-id may be a compact bit sequence that may uniquely identify the flow in the network, and can fit into the layer 2 forwarding table of Ethernet switches. The layer 2 forwarding table is typically much less expensive and consumes much less power than the use of a TCAM. Ethernet layer 2 forwarding tables are abundant in commodity Ethernet switches. The first-hop switch 130a may embed the new flow-id into the packet by overwriting certain fields in the packet header. The rest of the switches along the path of the packet may use this new flow-id to do exact matching that may be performed by using the layer 2 forwarding table. At the last-hop switch 130b in the network 100, a rule may be installed to recover the original packet header based on the flow-id.

For example, in a data center network, the first and last switches for a flow may typically be virtual switches running in a hypervisor, e.g., Open vSwitch. This data center network may simply include an addition step in processing the matched flow by translating between the original wildcard flow definition and the new flow-id. In a data center gateway facing the external network, for example, the hypervisor virtual switch 160a may use a TCAM to perform such a translation. Such matching may also be done in software as well. Other than such border switches, TCAMs in the internal switches in the data center may be eliminated because they are not necessary.

This use of flow-id's for routing may also be applicable in other networks such as enterprise networks or ISP networks. In such networks, the TCAMs on internal routers or switches may be eliminated. Similar to the data center case, the TCAMs on border switches or routers may still be needed in order to set/unset flow-id.

For example, an embodiment using flow-id's for routing based on Openflow will now be described in light of FIG. 1. A source host 160, which may be physical host or virtual machine, may generate a packet. The first-hop switch 130a looks up the packet in its flow table and tries to find a match by using wildcard matching. Next, because this may be the first packet of the flow, no matching is found. And hence the packet may be forwarded to the central controller. The central controller 110 may process the request, compute the forwarding or flow path, and install flow rules at the corresponding switches along the path. The flow rules may contain instructions regarding how the packet should be treated, for example, to be forwarded to a port, queued, or dropped. Further, flow rules may be stored as entries in a flow table.

However, unlike in the conventional Openflow network, this flow may be assigned a unique flow-id. The controller may install three types of rules along the computed paths. First, on the first-hop switch, one additional "action" is appended to the existing rule. The added action requires the flow-id to be embedded into the packet header before the packet is forwarded. Further details regarding the structure of this header are described below. Second, on the switches 120a-c other than the first-hop, no wildcard-based matching may need to be done. Instead, the switches 120a-c may perform an exact matching based on the new flow-id. Hence the actions of the rules in such switches 120a-c are the same, except matching may be based on the new flow-id. The switches 120a-c may forward, switch, or drop the packet based upon the rules associated with the flow-id. Third, on the last-hop switch 130b, one additional "action" may be appended to the existing rule. The added action may require that the flow-id be removed and the original header fields be restored.

Next, the first-hop switch 130a processes the packet according to the rule received from the central controller 110. Then the other switches 120a-c along the path of the packet conduct exact matching for the packet based on its flow-id and process it accordingly. Next, the last-hop switch 130b may restore the original header fields and deliver the packet to the destination host 162. Then, later packets that belong to the same flow may be processed in the switches 120a-c without consulting the central controller 110, because the switches 120a-c on the path of the packet already have the flow entry installed.

Next the definition of flow-id will be described. Given that packet processing is carried out in the switches based on the flow-id, such flow-id will be carried by each packet. One way would be to create a new tunneling header, e.g., IP in IP or IP in UDP. Such tunneling headers increase the frame size and hence may not work for all devices. Instead existing fields in the packet header may instead be used for the flow-id. One option would be to use VLAN ID, but there are two reasons against its use. First, in order to allow Openflow network to coexist with existing networks, operators often use VLAN ID to distinguish them. Second, VLAN ID contains 12 bits, corresponding to 4,096 flows, which may be too limited.

Instead, two options may be used. The first is to use the destination MAC address (dmac). The second is to use both the dmac and the source MAC address (smac).

Figure 2:
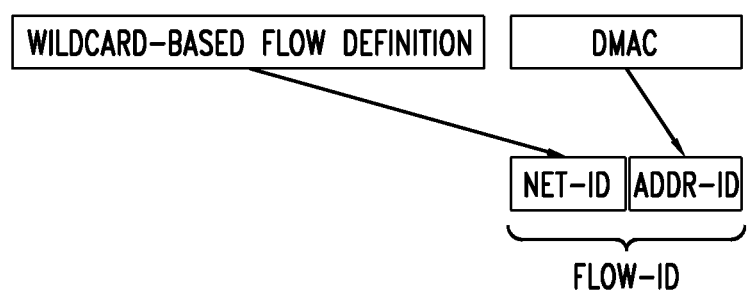
FIG. 2 illustrates an embodiment of the flow-id using the destination MAC address field.

FIG. 2 illustrates an embodiment of the flow-id using the destination MAC address field. The dmac field in the packet header contains 48 bits. Flow definition information may include a network identifier (net-id) and an address identifier (addr-id). The dmac field may be partitioned into two sections: net-id (36 bits); and addr-id (12 bits), as shown in FIG. 2. The net-id and addr-id may have other bit lengths as long as their combined bit length fits in the dmac field. Each flow as identified by its wildcard definition may be assigned a unique net-id. Because the original dmac field is being overwritten, steps need to be taken to make sure that the dmac field may be restored when the packet leaves the network. Note that packets in the same flow may have different destination MAC addresses. Hence, addr-id may be used to identify different destination MAC addresses within the same flow.

Further, both the net-id and addr-id may be set at the first-hop switch 130a and written to the dmac field. At the last-hop switch 130b, flow matching may be done based on the net-id and addr-id (i.e., the entire dmac field) in order to translate this back to the original destination MAC address. At other intermediate switches 120a-c, flow matching may be done based only on the net-id.

For example, suppose a flow is defined as follows: (src_ip=S, dst_ip=D, dst_port=530, proto_id=17). If the flow needs to be load balanced across two servers that share the same IP address but have different MAC addresses: M1 and M2, then a net-id, for example 12, may be assigned to the flow and a different addr-id may be assigned to each of M1 and M2, for example 1 and 2, respectively. On the first-hop switch 130a, there may be two entries: (src_ip=S, dst_ip=D, dst_port=530, proto_id=17, dmac=M1): set net-id=12, set addr-id=1, out [port_number]; and (src_ip=S, dst_ip=D, dst_port=530, proto_id=17, dmac=M2): set net-id=12, set addr-id=2, out [port_number].

There will be one entry on each intermediate switches: (Net-id=12): out [port_number].

At the last-hop virtual switch, there will be two entries: (net-id=12, addr-id=1): set dmac=M1, out [port_number]; and (net-id=12, addr-id=2): set dmac=M2, out [port_number].

Note that the intermediate switches use the net-id, i.e., the first 36 bits of the dmac field to do exact matching. The flow tables in such switches may contain the net-id and corresponding rules.

Figure 3:
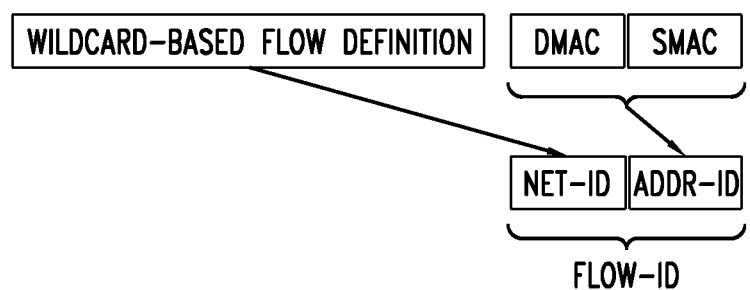
FIG. 3 illustrates another embodiment of the flow-id using the source MAC address and the destination MAC address field.

FIG. 3 illustrates another embodiment of the flow-id using the source MAC address and the destination MAC address field. The dmac field may be used to store a net-id, and smac field may be used to store addr-id, as shown in FIG. 3. The following shows the rules at the switches on the flow path for the same example discussed above with respect to FIG. 2.

On the first-hop virtual switch 130a, there may be two entries: (src_ip=S, dst_ip=D, dst_port=530, proto_id=17, smac=M3, dmac=M1): set net-id=12, set addr-id=1, out [port_number]; and (src_ip=S, dst_ip=D, dst_port=530, proto_id=17, smac=M4, dmac=M2): set net-id=12, set addr-id=2, out [port_number].

There may be one entry on each intermediate switch 120a-c: (Net-id=12): out [port_number].

At the last-hop virtual switch 130b, there may be two entries: (net-id=12, addr-id=1): set smac=M3, dmac=M1, out [port_number]; and (net-id=12, addr-id=2): set smac=M4, dmac=M2, out [port_number].

The data structure in FIG. 3 has the following advantages. First, lookup at the intermediate switches are done by using entire dmac field, the same operation as found in the standard L2 forwarding. This leads to minimum change in Ethernet switch hardware to support Openflow. Second, there are more bits for both net-id and addr-id, so that a larger number of flows may be supported ($2^{48}$ for FIG. 3 vs. $2^{36}$ for FIG. 2)

However, the data structure of FIG. 3 also has the following drawback: because both the smac and dmac are used, both the smac and dmac need to be restored at the last-hop switch 130b. This may lead to more flow entries at the first and last switches because it needs to accommodate all smac and dmac combinations. In the example above, if M3 also sends packets to M2, an additional addr-id needs to be assigned for (M3, M2) and an additional rule needs to be installed at first and last-hop switches to do such mapping.

The embodiments described above provide at least the following benefits. First, by eliminating the need for TCAM in most of switches in the SDN network, and instead relying on layer 2 forwarding tables (typically CAM), the cost of implementing a SDN may be significantly reduced. Second, power consumption of the switches may also be significantly reduced. Third, the solution is transparent to end points. Finally, the solution does not require any change in Openflow protocol.

When processor-executable programs are implemented on a processor, the program code segments may combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

It should be apparent from the foregoing description that various exemplary embodiments of the invention may be implemented in hardware or firmware, such as for example, the central controller. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for controlling a data packet network by a central controller, comprising:
   receiving flow identification information including a source address and a destination address;
   determining a flow path through the data packet network by identifying network nodes along the flow path including a first-hop switch, a last-hop switch, and intermediate network nodes;
   sending flow table data to each identified intermediate network node along the determined flow path, wherein the flow table data sent to each identified intermediate network node includes a unique flow identifier and an address for a next node along the flow path and the unique flow identifier fits into a layer 2 forwarding table of each identified intermediate network node for matching;
   sending flow table data to the first-hop switch, wherein the flow table data sent to the first-hop switch includes a destination media access control (DMAC) address, a network identifier, and an address identifier, the network identifier identifies a flow, and the address identifier identifies different DMAC addresses within the flow; and
   sending flow table data to the last-hop switch, wherein the flow table data sent to the last-hop switch includes the network identifier, the address identifier, and the DMAC address.

2. The method of claim 1, wherein a source media access control (SMAC) address is associated with the DMAC address, the network identifier, and the address identifier.

3. The method of claim 1, wherein the flow table data sent to the last-hop switch includes packet header information to be restored to a data packet.

4. The method of claim 1, wherein the network identifier identifies a wildcard-based flow.

5. The method of claim 1, wherein a combined bit length of both the network identifier and the address identifier fits within a bit length of a DMAC field.

6. The method of claim 1, further comprising:
   receiving flow table data information from the central controller.

7. The method of claim 1, wherein the first-hop switch is a hardware-based switch.

8. The method of claim 1, wherein the last-hop switch is a hardware-based switch.

9. The method of claim 1, further comprising:
   installing, by the central controller, an additional action that is appended to an existing rule on the first-hop switch.

10. The method of claim 9, wherein the additional action requires the unique flow identifier to be embedded into a packet header before forwarding a packet.

11. The method of claim 1, further comprising:
    installing, by the central controller, an additional action that is appended to an existing rule on the last-hop switch.

12. The method of claim 11, wherein the additional action requires removal of the unique flow identifier and restoration of original header fields.

* * * * *